(12) United States Patent
Bedingfield

(10) Patent No.: US 8,479,104 B2
(45) Date of Patent: Jul. 2, 2013

(54) METHODS, SYSTEMS, DEVICES AND COMPUTER PROGRAM PRODUCTS FOR COLLECTING AND SHARING SELECTED PERSONAL DATA

(75) Inventor: James Carlton Bedingfield, Lilburn, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 660 days.

(21) Appl. No.: 12/635,306

(22) Filed: Dec. 10, 2009

(65) Prior Publication Data
US 2010/0088610 A1    Apr. 8, 2010

Related U.S. Application Data

(63) Continuation of application No. 11/253,342, filed on Oct. 19, 2005, now Pat. No. 7,676,753, which is a continuation-in-part of application No. 11/031,777, filed on Jan. 7, 2005, now Pat. No. 7,802,205.

(51) Int. Cl.
*G06F 9/4443* (2006.01)
*G06F 3/0481* (2013.01)

(52) U.S. Cl.
USPC ............ 715/745; 715/730; 715/741; 715/750

(58) Field of Classification Search
USPC .................. 715/730, 741, 745, 750
See application file for complete search history.

(56) References Cited

U.S. PATENT DOCUMENTS

| 3,798,603 A | 3/1974 | Wahlberg |
| 6,408,309 B1* | 6/2002 | Agarwal ............................. 1/1 |
| 8,010,458 B2* | 8/2011 | Galbreath et al. ............ 705/319 |
| 2002/0143861 A1 | 10/2002 | Greene et al. |
| 2002/0196280 A1 | 12/2002 | Bassett et al. |
| 2003/0195023 A1 | 10/2003 | Di Cesare |
| 2006/0085751 A1* | 4/2006 | O'Brien et al. ............... 715/727 |

OTHER PUBLICATIONS http://music.yahoo.com/promo-18684304--smash, 3 sheets; Date unknown but believed to be before Jan. 2005.
http://mf.music.yahoo.com/launch/photos.html, 3 sheets; Date unknown but believed to be before Jan. 2005.
http://music.yahoo.com/read/default.asp, 2 sheets; Date unknown but believed to be before Jan. 2005.

* cited by examiner

*Primary Examiner* — Namitha Pillai
(74) *Attorney, Agent, or Firm* — Myers Bigel Sibley & Sajovec

(57) ABSTRACT

Methods, systems, devices and computer program products obtain and share personal data of celebrities and others over a communications network. The methods include; (a) electronically capturing personal data associated with a plurality of celebrities; (b) electronically storing the captured data in a database of electronic personal data records, the records being correlated to a respective celebrity; (c) accepting user input to request data of interest for a particular celebrity; (d) electronically automatically extracting records in the historical data base related to the user input; and (e) electronically publishing celebrity personal data to the user based on the extracting step.

14 Claims, 11 Drawing Sheets

METHODS, SYSTEMS, DEVICES AND COMPUTER PROGRAM PRODUCTS FOR COLLECTING AND SHARING SELECTED PERSONAL DATA

RELATED APPLICATIONS

This application is a continuation of U.S. patent application Ser. No. 11/253,342, filed Oct. 19, 2005, issued as U.S. Pat. No. 7,676,753, which is a continuation-in-part of U.S. patent application Ser. No. 11/031,777, filed Jan. 7, 2005, entitled Graphical Chronological Path Presentation, issued as U.S. Pat. No. 7,802,205, the contents of which are hereby incorporated by reference as if recited in full herein.

FIELD OF THE INVENTION

The present invention relates to collecting and sharing personal data and, may be particularly suitable for providing services over a communications network.

BACKGROUND OF THE INVENTION

Many people are interested in personal data associated with others, such as a family members or celebrities. Celebrity personal data, such as pictures, births, accidents and other current events experienced by celebrities have conventionally been collected by reporters and paparazzi that trail public figures. The images and personal information so gleaned has been published in newspapers, entertainment and other magazines. Fan clubs or websites may also provide certain personal data about its celebrity member(s) and may publish the information online so that the fans and/or others can review the information using the Internet.

For family data, some photographic services can use the Internet to provide user access passwords and access addresses that can allow multiple users (such as families) to access electronic photographs.

SUMMARY OF THE INVENTION

Methods, systems, devices and computer program products obtain and share personal data of celebrities and others over a communications network. Some embodiments of the present invention may arise from a goal to be able to allow a user to "mimic" or copy certain behaviors, choices, and/or actions of a celebrity.

Some methods include; (a) electronically capturing personal data associated with a plurality of celebrities; (b) electronically storing the captured data in a database of electronic personal data records, the records being correlated to a respective celebrity; (c) accepting user input to request data of interest for a particular celebrity; (d) electronically automatically extracting records in the historical data base related to the user input; and (e) electronically publishing celebrity personal data to the user based on the extracting step.

According to some embodiments of the present invention, personal data can be electronically collected and shared based on celebrity-specific acceptable protocols or privacy rules.

Other embodiments are directed to systems for collecting and providing personal data of celebrities. The systems can include: (a) a celebrity database in communication with a plurality of celebrity computers; (b) a server in communication with the celebrity database; and (c) a plurality of celebrity electronic interfaces in communication with the server, at least one for each respective participating celebrity.

In particular embodiments, the interface can include an interactive gateway with privacy criteria on the type and content of data electronically obtainable for transmission to the server from a respective celebrity computer. In some embodiments, the interface may include an application module that defines a privacy protocol with the privacy criteria for types of personal data permitted for public capture.

In some embodiments, the system may also include a subscriber server that controls a subscriber's access to data or data content that a subscriber is allowed to receive from the host server.

Some embodiments are directed to computer program products for providing a multimedia information service over a communications network, the computer program product includes computer readable storage medium having computer readable program code embodied therein configured to carry out one or more method steps noted above.

Other embodiments are directed to systems that obtain and share personal data associated with a trip. The systems include a plurality of portable travel data capturing devices, one for a respective traveler user. The devices having a Global Positioning System, a digital camera, an audio recorder, and an electronic time date identifier circuit associated therewith. The portable devices can be configured to electronically capture travel data associated with a user's trip. The portable devices can include a trip publication module that electronically generates a retrospective travel itinerary based on the captured travel data. The devices can be configured so that the captured travel data is electronically transferable to an electronic network for sharing the captured travel data with others.

In some embodiments, the travel data can include at least one travel destination, any tourist attractions visited, images taken during the trip with the device, lodgings and restaurants visited, and the travel data can be captured in chronological order.

Some embodiments are directed to methods for obtaining and sharing personal data associated with a trip. The methods can include: (a) providing a plurality of portable travel data capturing devices, one for a respective traveler user, the devices having a Global Positioning System, a digital camera, an audio recorder, and an electronic time date identifier circuit associated therewith; (b) electronically capturing travel data associated with different user's trips using respective ones of the portable devices, the travel data including at least one travel destination, any tourist attraction visited, images taken during the trip with the device, the name and location of lodgings used and restaurants visited; (c) electronically generating a retrospective travel itinerary based on the captured travel data; and (d) electronically sharing the retrospective travel itinerary with others over a network.

The travel data may include electronic time and date stamps automatically correlated or attached associated therewith. The electronically generating step can include electronically automatically generating a plurality of images that correspond to the locations and actions identified in the retrospective travel itinerary.

Other embodiments, are directed to computer program products for generating the retrospective travel itinerary with images, the computer program product include a computer readable storage medium having computer readable program code embodied therein configured to carry out any of the method steps noted above or in the claims.

In some embodiments, the content associated with the celebrity information service may be provided in real time and/or near real time multimedia content, such as location, event attendance, computer activity, digital song library content, and/or vendor patronage. In other embodiments, the data may be captured in real time or near real time but publication may be delayed to provide additional measures of privacy.

Other methods, systems, devices, and/or computer program products according to other embodiments of the invention will be or become apparent to one with skill in the art upon review of the following drawings and detailed description. It is intended that all such additional methods, systems, devices, and/or computer program products be included within this description, be within the scope of the present invention, and be protected by the accompanying claims.

DETAILED DESCRIPTION OF EMBODIMENTS OF THE INVENTION

Figure 1:
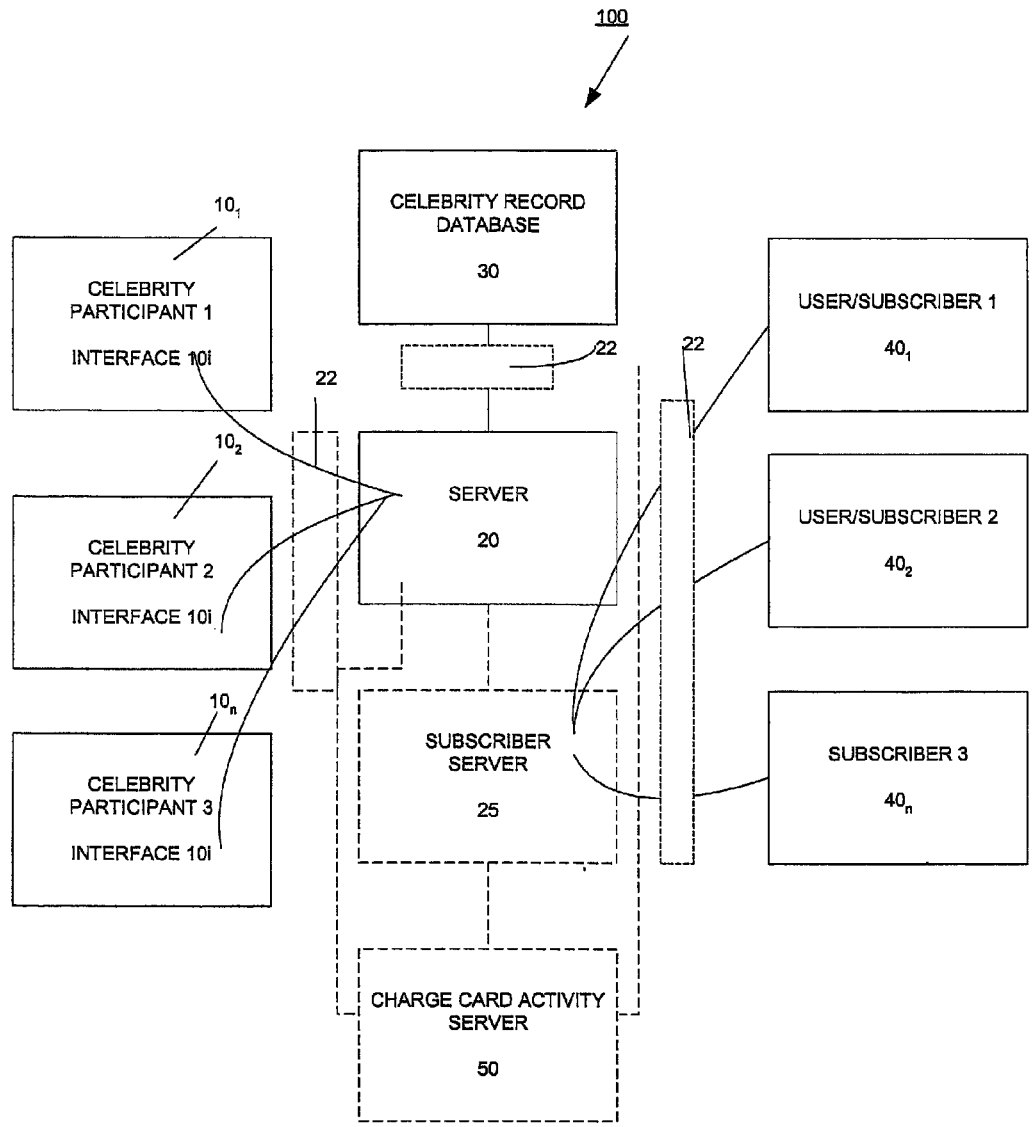
FIG. 1 is a block diagram that illustrates a system for providing celebrity data over a computer network according to some embodiments of the present invention.

Specific exemplary embodiments of the invention will now be described with reference to the accompanying drawings. This invention may, however, be embodied in many different forms and should not be construed as limited to the embodiments set forth therein. Rather, these embodiments are provided so that this disclosure will be thorough and complete, and will fully convey the scope of the invention to those skilled in the art. The terminology used in the detailed description of the particular exemplary embodiments illustrated in the accompanying drawings is not intended to be limiting of the invention. In the drawings, like numbers refer to like elements.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

In addition, the sequence of operations (or steps) is not limited to the order presented in the figures and/or claims unless specifically indicated otherwise. In the drawings, the thickness of lines, layers, features, components and/or regions may be exaggerated for clarity and broken lines illustrate optional features or operations, unless specified otherwise.

As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the term "celebrity" refers to a public and/or famous (or infamous) figure, including actors, actresses, singers, groups (bands), sports figures, wealthy persons, public officers, corporate officers, movie directors, sports team or racecar owners, newscasters, politicians and other reasonably well-known persons. Family members of a celebrity are also considered a "celebrity" for the purposes of this patent application. The term "celebrity" is not limited to people as famous animals may also be considered a "celebrity".

The term "publish" and derivatives thereof refer to providing the data in a format useable by the requestor. The format can be a standardized format that is viewable by a browser and/or may include short text messaging, emails or other publishing formats.

The term "retrospective itinerary" means a summary of places and dates generated based on collected electronic data that provides a third party with a chronological schedule or list of places that a user or celebrity has visited over a certain time period. The retrospective itinerary does not have to account for all time periods in a day, nor all days in a period of interest.

The present invention may be embodied as methods, systems, mobile devices, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium include the following: an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, then stored in a computer memory.

As will be appreciated by one of skill in the art, embodiments of the invention may be embodied as a method, system, data processing system, or computer program product. Accordingly, the present invention may take the form of an entirely software embodiment or an embodiment combining software and hardware aspects, all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic or other electronic storage devices.

Computer program code for carrying out operations of the present invention, including for example, communication, data collection and publishing, may be written in an object oriented programming language such as Java, Smalltalk or C++. However, the computer program code for carrying out operations of the present invention may also be written in conventional procedural programming languages, such as the "C" programming language or in a visually oriented programming environment, such as VisualBasic.

Certain of the program code may execute entirely on one or more of the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider). As will be discussed further below, in some particular embodiments, some program code may execute on a celebrity computer using an interface with a remote computer. The celebrity computer may be configured as a "gateway" computer and some program code can execute on a server with communication between the celebrity gateways and the server using the Internet.

The invention is described in part below with reference to flowchart illustrations and/or block diagrams of methods, systems, computer program products and data and/or system architecture structures according to embodiments of the invention. It will be understood that each block of the illustrations, and/or combinations of blocks, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory or storage that can direct a computer or other programmable data processing apparatus to function in a particular manner, such that the instructions stored in the computer-readable memory or storage produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Embodiments of the present invention will now be discussed with respect to the figures. FIG. 1 illustrates an example of a system 100 that includes a plurality of celebrity participants $10_1$ $10_2$ ... $10n$ that communicate with a server 20. The server 20 is in communication with a celebrity record database 30. Each celebrity participant $10_1$, $10_2$, $10n$ can communicate with the server 20 using an electronic interface 10i. The interface 10i can include a celebrity computer configured with an interactive gateway or an application or other suitable program. The server 20 can be configured to automatically electronically capture data associated with the celebrity. The data of a respective celebrity can include a particular computer configuration, application software, games, Itunes, browser history, digital images including pictures and movies.

In order to facilitate acceptance, it may be desirable to provide a celebrity with the ability to decide when to allow the server to electronically monitor and obtain data from the celebrity computer. For example, the interface 10i can be configured with an access link, tool or switch that can be activated or deactivated by a celebrity at any time. Alternatively, a celebrity can have a special "public authorized" access password so that when the celebrity is logged on to a computer using this password access is automatically granted. The activation and/or deactivation button can be provided in a toolbar so that even when logged on using the "public" authorization, the celebrity participant can instantly deny such permission. Alternatively or additionally, a "public" computer or pervasive computing or communications device can be used whereby access is automatically granted upon use. In some embodiments, a deactivation or "permission deny" input tool can be loaded onto the dedicated "public" access device (whether a desktop computer, portable device or otherwise) to allow a user to turn off the remote electronic monitoring.

The public authorization of the interface 10i can be used to electronically authorize one or more digital cameras to automatically activate to collect images of the celebrity or the celebrity's environment at any or selected points in time. The camera may be located on the computer used to grant access (i.e., the interface or gateway), in a portable communications device (such as a wireless telephone) and/or in other cameras located on the celebrity's property. The public authorization can be structured so that a celebrity can elect to authorize activation of all levels of data collection and image collection or may be carried out to allow the celebrity to select what level of access to grant at any time. Thus, in some embodiments a celebrity can authorize images from one camera (still frame or video), prohibit images from all cameras and the like.

The system 100 can include one or more firewalls 22. The system 100 is also configured to communicate with a plurality of users, that may be subscribers $40_1$, $40_2$, $40n$. The users/subscribers 40 can receive celebrity data from the server 20 by any suitable communication means, including one or more of wireless messaging to mobile terminals, such as PDA's, wireless communication systems (such as cellular telephones), personal or business computers, portable computers, via email (with or without attachments), voicemail, storage into a database or storage medium associated with the user/subscriber 40 and the like.

As used herein, the term "mobile terminal" or "mobile device" may include a satellite or cellular radiotelephone with or without a multi-line display; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices. Communications networks are widely used for nationwide and worldwide communication of voice, multimedia and/or data. As used herein, communications networks include public communications networks, such as the Public-Switched Telephone Network (PSTN), terrestrial and/or satellite cellular networks, and/or the Internet.

The system 100 can include a plurality of networks, such as a Public-Switched Telephone Network (PSTN), an Internet Protocol (IP) network and a wireless network. The PSTN and the IP network may include a plurality of customer premises equipment coupled thereto, such as a telephone/fax/modem and an Internet Protocol Television. The wireless network may include at least one transmitter, such as base station transceiver, and may include a plurality of mobile devices. The plurality of mobile devices may include subscriber mobile devices, which may be associated with a subscription to an information service, and celebrity mobile devices.

The system 100 can employ networks that utilize multiple wireless and/or wireline access protocols. For example, the wireless access protocols may include GSM GPRS, GSM EDGE, GSM UMTS, CDMA 1×RTT, CDMA EVDO, Wi-Fi, and/or Wi-MAX. The wireline access protocols may include, for example, DSL, cable modem, and/or Ethernet. The IP network may represent a global network, such as the Internet, or other publicly accessible network. The IP network may also, however, represent a wide area network, a local area network, an Intranet, or other private network, which may not accessible by the general public. Furthermore, the IP network may represent a combination of one or more wired and/or wireless public and/or private networks and/or virtual private networks (VPN).

Optionally, as shown in FIG. 1, the system 100 can include a subscriber server 25 and a charge card activity server 50. The subscriber server 25 can be a pay for subscription or free service subscription based server. The subscriber server 25 may also be configured to administer access and/or provide different types of content to different subscribers (as will be discussed below with respect to FIG. 7 and FIG. 8). In other embodiments, no subscriber input/server is required as a user can merely obtain information through public access of a website or browser and the like.

It is noted that in the figures and specification, although one server and/or database is identified for a particular purpose that function can be integrated into a common server or split into multiple servers. In addition, although shown as one central server 20, several servers, centralized or decentralized, may be used to carry out the functions/operations contemplated by embodiments of the present invention.

The charge card activity server 50 can electronically track the purchasing data of a celebrity and input that data into the celebrity record database. The charge card data may include the items purchased, the date purchased and/or the store or vendor from where the purchase occurred. For example, for a respective celebrity, the data may provide a list of CD's or DVD's purchased, the type of clothing purchased, a restaurant where food or beverages were purchased, and the like as well as dates and times of purchases that can allow a retrospective itinerary to be generated. A celebrity may authorize this monitoring and capturing of charge data by using a particular charge card that is issued for this particular purpose and/or by using privacy protocols that allow the data collection to filter the charge card data to prevent publication, capture of "private" data or data that a celebrity does not want to be made publicly available.

Figure 2:
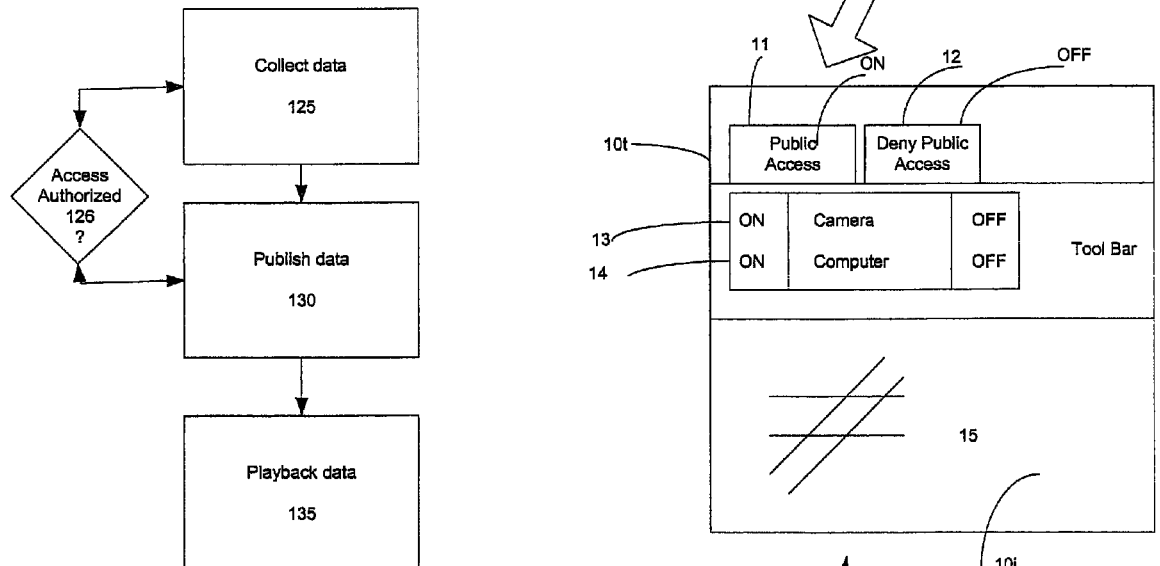
FIG. 2 is a block diagram of operations that can be used to provide celebrity data according to some embodiments of the present invention.

FIG. 2 illustrates an overview of operations according to embodiments of the present invention. Personal data is collected (block 125) and stored. The personal data is collected for authorized celebrity participants and the data can be selectively collected based on input by a respective celebrity. The data is organized into appropriate presentation formats depending upon content type and desired information and published (block 130). The published data can be played back and reviewed by a user (block 135).

In some embodiments, before collecting data and/or before publishing data, the system can electronically confirm that access to the data collecting and/or publishing has been authorized (block 126).

The system can be configured to provide publications of collected data to various users for different celebrities. The display can be standardized for all participating celebrities and/or users or may be customized for each celebrity and/or each user.

In some embodiments, the system can be configured to generate a publication that is responsive to a particular request. In the former situation, the publication can be generated but published to a user for display using a browser, a text messaging, IM, or other publication model. In the latter situation, a subscriber or user can request data of a certain celebrity and one or more topics of interest, the data records can be monitored and relevant information extracted and published upon request by researching records at the request time. A user can ask for updates to be sent to them or to notify them when updates or changes have occurred, automatically over time based on a subscription to certain types of data for certain celebrities.

The display can include a graphical chronological format of data, which may be cached for response speed in some embodiments. A current date can be tracked and real-time data can be displayed. XML-style data markers can be used to store and/or publish (display) data according to certain category types. In some embodiments, the data can be stored for a respective celebrity so that each category of data is a lane in a graphical representation of a multi-lane highway with the data in each lane selectable or arranged by date that can be reviewed in forward and reverse. Icons can be used to allow a user to zoom in to a particular feature for display or related additional data and the like.

Figure 3:
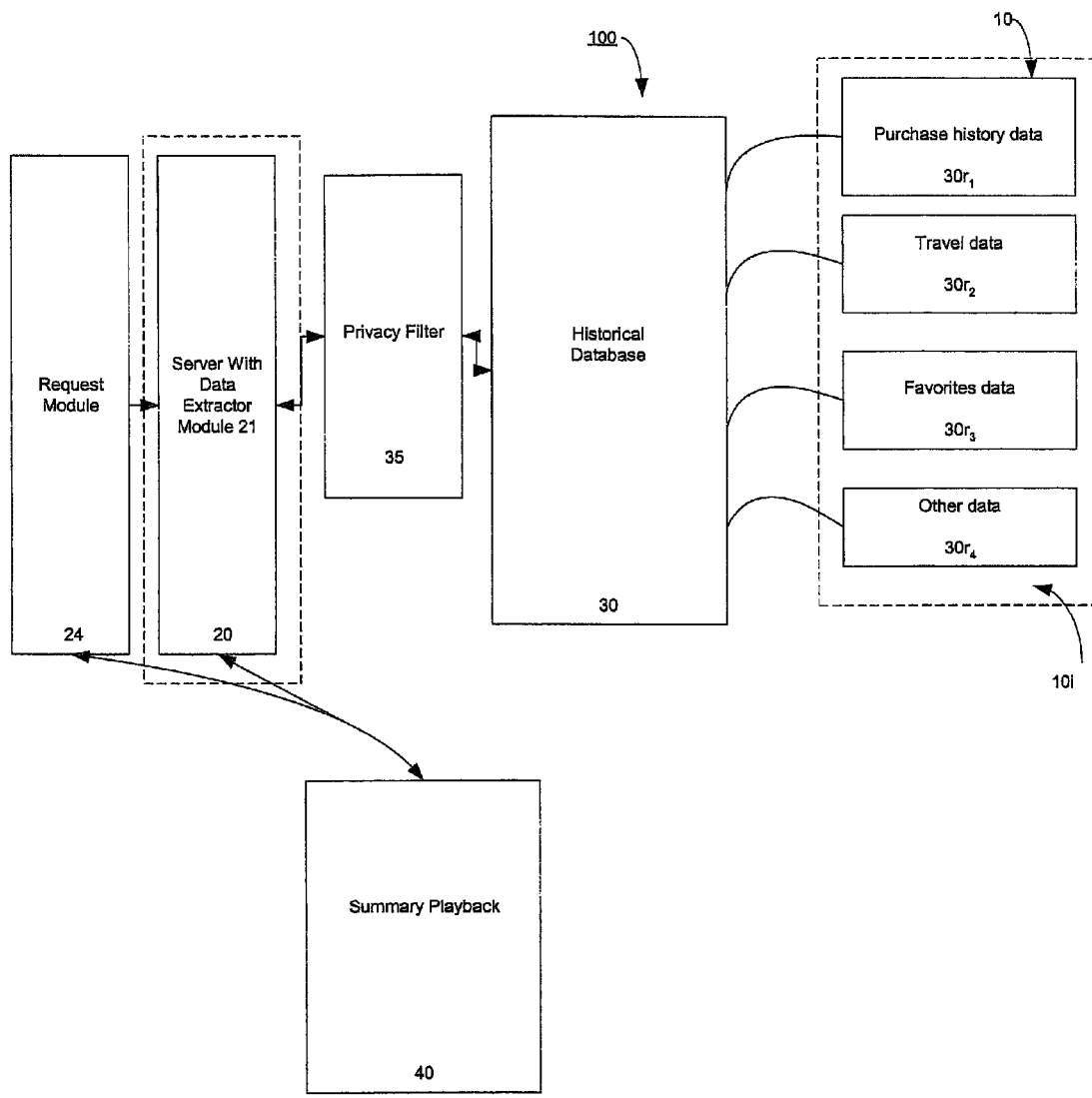
FIG. 3 is a block diagram of a system for selectively collecting and/or publishing data according to some embodiments of the present invention.

FIG. 3 is a schematic illustration of a data collection and sharing system 100 according to embodiments of the present invention. The system 100 can include a request module 24 that allows a user 40 to electronically request data on a particular celebrity. As shown, the server 20 can include a data extractor module 21 that is in communication with a privacy filter 35 and a historical database of records 30. The privacy filter 35 can be configured to prevent certain types of data from being output to a viewer/user 40 for a certain time period or without additional permission. That is, the database 30 may be able to store some data that a celebrity does not want automatically published upon request to certain viewers. As will be discussed below, the system 100 may employ a multi-level privacy sharing protocol so that some users may be able to obtain more data than others (such as family members, fan clubs, sponsors and the like).

The database 30 can store records 30r of each celebrity. Examples of types of records include, but are not limited to, purchase history data $30r_1$, travel data $30r_2$, favorites data $30r_3$, and other data $30r_4$. The data 30r can be electronically obtained at certain time intervals or continuously using a cookie, spyware, input from the celebrity or a third party, or other tracking, monitoring hardware and/or software. The data can be obtained using the interface 10i of a celebrity 10. The database 30 can be a "historical" archive of data records that may be include records of different events, actions and information, all of which may include associated chronological data (time of generation or creation of a particular record or date/time of purchase and the like). For example, the data records can be used to generate and publish a report (daily, weekly, monthly, annually and the like) on a particular celebrity that summarizes various trips taken, online games played, shops or restaurants visited and the like. In other examples, the data records can be used to generate a summary playback on a user's display device 40 of images, scenes, voice comments, and other data related to a particular trip or event.

Figure 4:
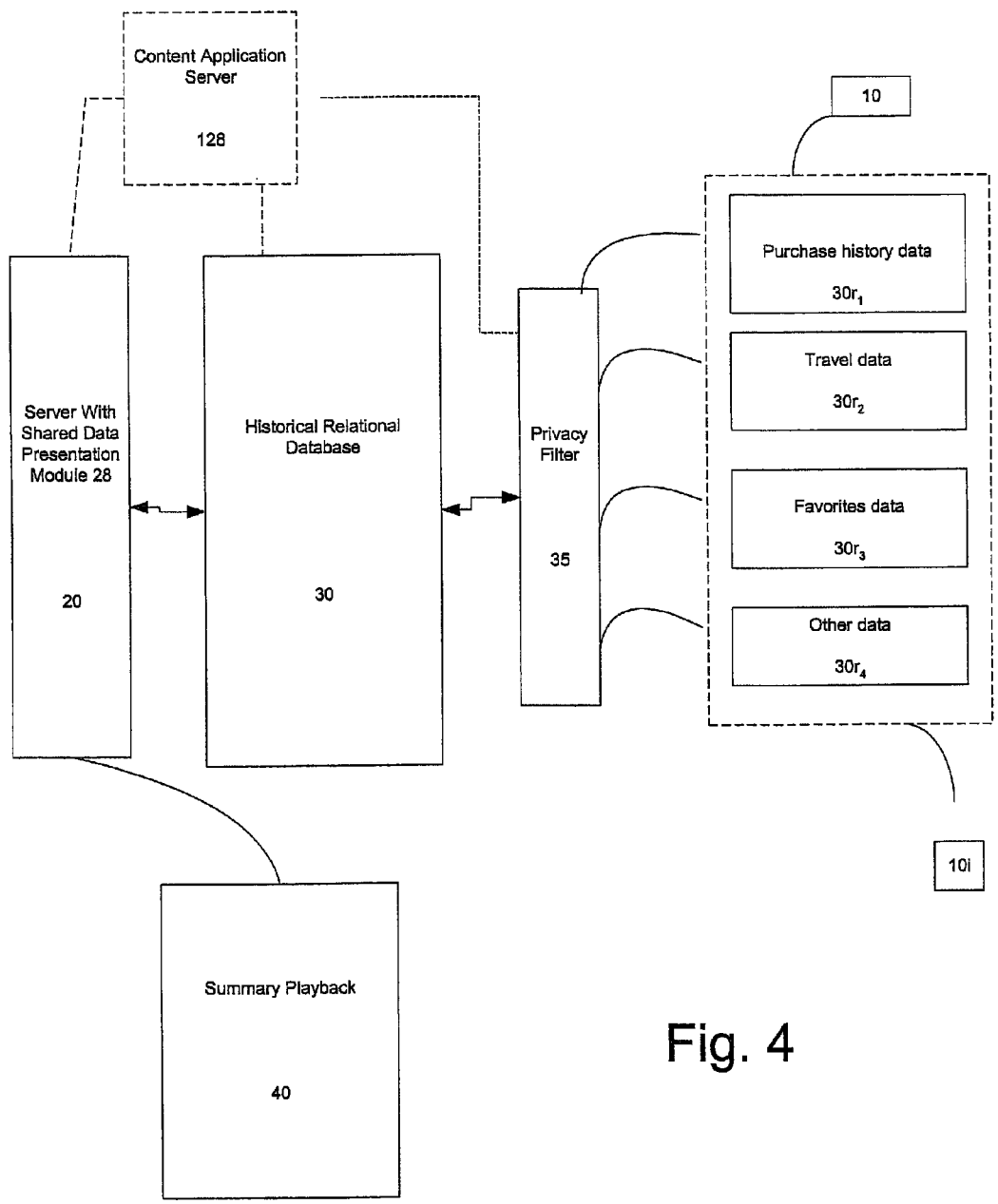
FIG. 4 is a block diagram of a system for selectively collecting and/or publishing data similar to that shown in FIG. 3 but with an alternate or additional privacy filter according to some embodiments of the present invention.

FIG. 4 illustrates another embodiment of a system 100 similar to that shown in FIG. 3. In this embodiment, the privacy filter 35 can be configured to prevent data collection by the database 30 (and server 20). The privacy filter 35 can be provided by the interface 10i, by an application or other program module in communication with or in the server 20 and the like. The privacy filter can include a user interface that can allow each celebrity to define an acceptable level of privacy for different types of data and can include a toolbar interface that allows a user to modify, activate or deactivate "public" access over time as noted above. The server 20 can include a shared data presentation module 28 that generates a display of data for presentation with one or more users. The shared data presentation module 28 can be configured to generate a presentation based on a user's input or can transmit the data for playback upon a user's request or selection of a link.

In other embodiments, a read-only (non-editable) multimedia player can hold the desired data content of particular celebrities and the players can be sold or loaned on a "pay-per-view" or time period. In still other embodiments, the data can be loaded onto a DVD that can be ordered by a user. The content on the DVD can be generated upon user request and customized based on user/requestor input of data of interest. The DVD can be a conventional type DVD or a limited playback (self-destructing) version.

As also shown in FIG. 4, the server 20 with the shared data presentation module 28 can be in communication with a content application server 128 that extracts the data maintains and/or provides the data content that is to be transmitted to users 40, such as to subscriber mobile devices. For example, the content application server 128 may be configured to provide real-time and/or near-real time multimedia content, such as images, purchases, online gaming, and the like. The content may be provided, for example, using a known transmission technology, such as audio/video streaming. In some embodiments, the content application server 128 may also be configured to format the content associated with the information service to provide subscriber content that is encoded and/or otherwise configured to prevent at least some use by devices that are not associated with a subscription to the information service, such as non-subscriber mobile device.

Either or both celebrity 10 or user 40 mobile devices (used to transmit data for publication or to receive published celebrity data, respectively) may each include a wireless local area network interface transceiver that supports communication over a wireless local area network. For example, a mobile device may use a wireless local area network transceiver to establish a wireless communication session to receive the subscriber content. The wireless local area network interface transceiver, for example, may be provided according to a Wi-Fi (IEEE 802.11) and/or Wi-MAX standard. In addition, each of the mobile devices may include the functionality of a PLMN transceiver and/or wireless modem. As such, a mobile device may also use a PLMN transceiver to establish a wireless communication session over a cellular network, for example, using a packet switched connection such as that provided by the Enhanced Data GSM Environment (EDGE) standard, the General Packet Radio Service (GPRS) standard, and/or the Universal Mobile Telecommunications System (UMTS) standard.

Computer program code for carrying out operations of the system 100 may be written in a high level programming language, such as C or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Figure 5:
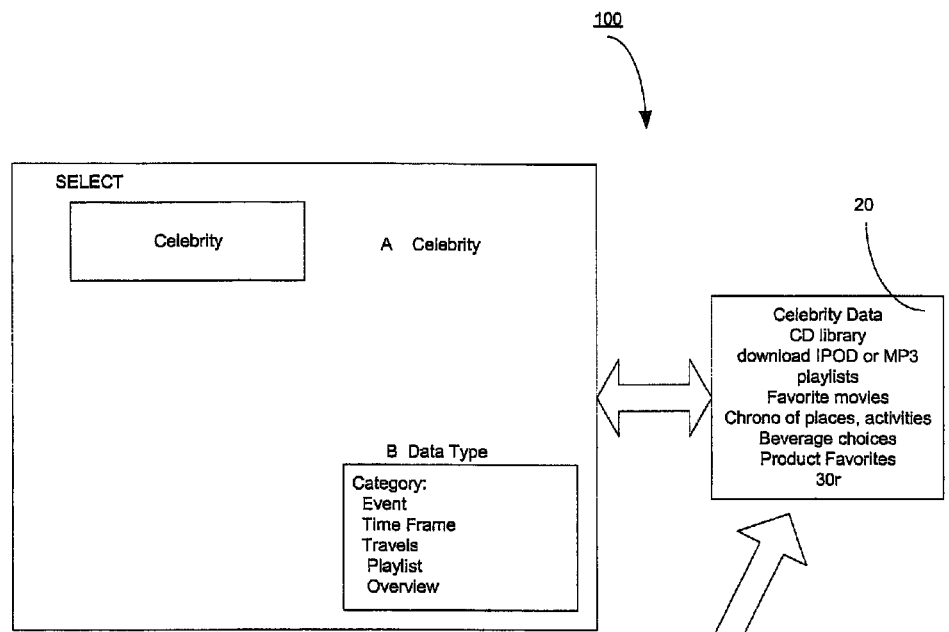
FIG. 5 is a block diagram of a system that can provide user requested celebrity data according to embodiments of the present invention.

FIG. 5 is a schematic illustration of the celebrity data system 100. As shown, a celebrity 10 has a celebrity interface 10i with a toolbar 10t that has public access authorize 11 and deny 12 inputs (such as screen icons or buttons). The toolbar 10t may also include specific feature activation and deactivation, such as camera on and off 13 and computer monitoring on and off 15. The toolbar 10t can be generated on a portion of a display 15 of a mobile or stationary device.

As is also shown in FIG. 5, data from the celebrity 10 can be transmitted to the server 20 (directly or indirectly), which has access to celebrity records 30r. Some of the exemplary data records include a CD library of favorite CD's, IPOD or MP3 playlists, screen saver used, ringer tone or music used, favorite movies, favorite sports teams, favorite books (or recent books or movies purchased), a chronological list of places visited over a certain time frame, beverage choices, and product selections (and favorites). The system 100 is configured to allow a user/subscriber 40 to interactively request data on a certain celebrity (choice A) and one or more category B selections, such as data type, time period, overview (facts of general interest), songs in a celebrity playlist and the like.

In some embodiments, in a request field A, more than one celebrity can be selected by a user 40 and a comparison of the celebrities can be generated using selected data fields or automatically created or predefined data fields. For example, publication that provides a comparison data of "teen actress 1" and "teen actress 2" that can summarize personal facts and other data, such as recent travels, movies, dates, images, pets and the like.

Figure 6:
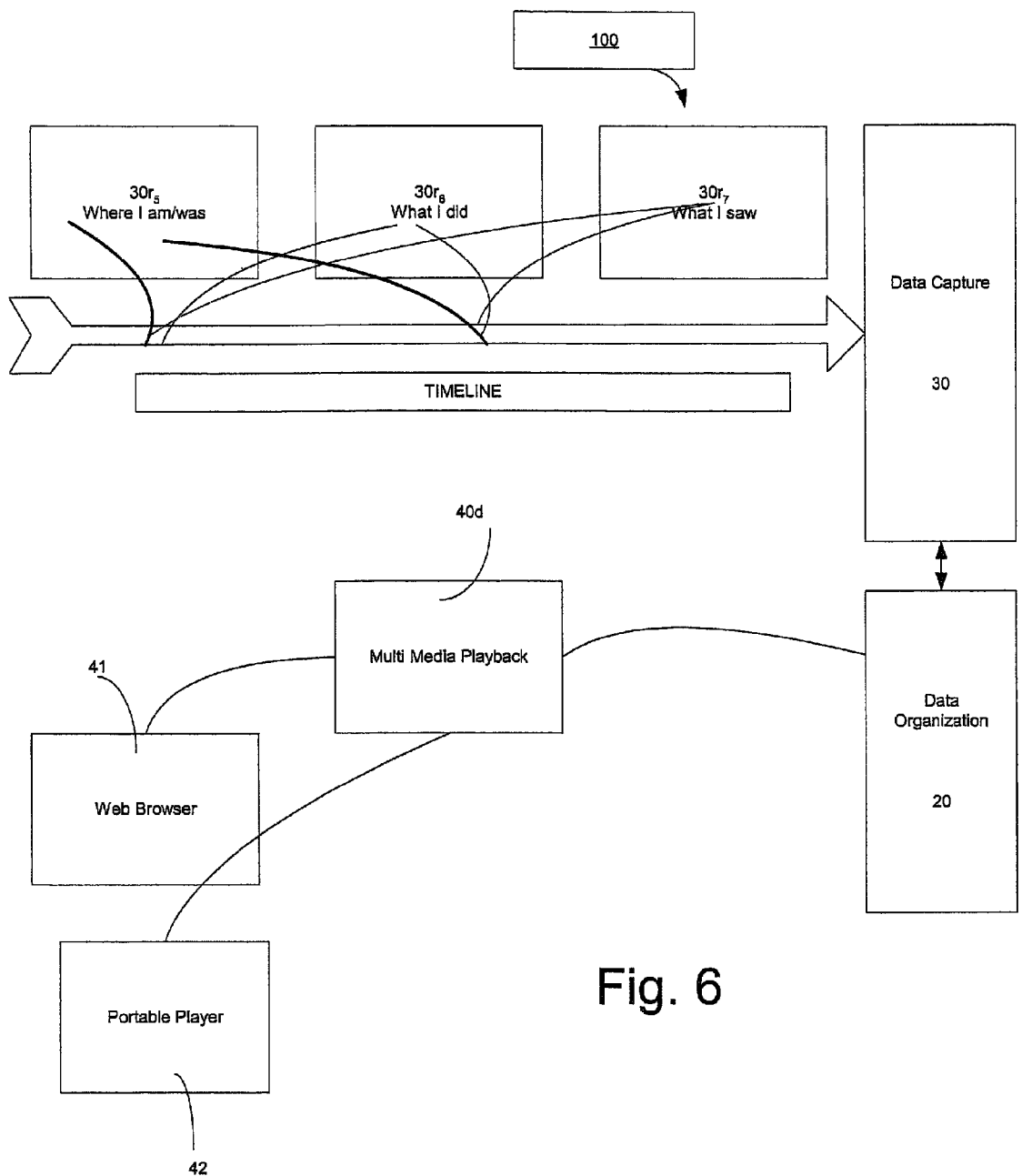
FIG. 6 is a schematic illustration of a system for capturing personal data and publishing the data according to embodiments of the present invention.

FIG. 6 is a schematic illustration of another embodiment of the present invention. As shown, three types of electronic data, $30r_5$, $30r_6$ and $30r_7$ can be automatically or semi-automatically collected and captured in a database 30 over time. The three types of data can be summarized for each celebrity as "where I am/was" $30r_5$, "what I did" $30r_6$ and "what I saw" $30r_7$. The collected data can be organized and published to provide a multimedia playback 40d that mimics or replays a day, week, month and the like in the life of the celebrity.

The collected data can be collected without requiring ongoing input of the celebrity. For example, the data can include GPS tracking data from a mobile device that locates the celebrity to a geographical location, charge card data that identifies a restaurant, images from the mobile device of scenery or images taken from other resources that correspond to the GPS data, and the like. The collected data can also include voice commentary from the celebrity and third party input.

That is, the system 100 can be configured to take electronic or voice input from third parties. For incentive, the system can be configured to give bonus points to third parties that provide celebrity sightings, including the types of products purchased, where they were seen and who they were with and the like. The points can be used to receive promotional materials. It is anticipated that some third parties may want to provide input as the input is an endorsement of their establishment or product.

FIG. 6 also illustrates that the playback 40d can be carried out using a web browser 41 and/or a portable device 42, as was discussed above.

Figure 7:
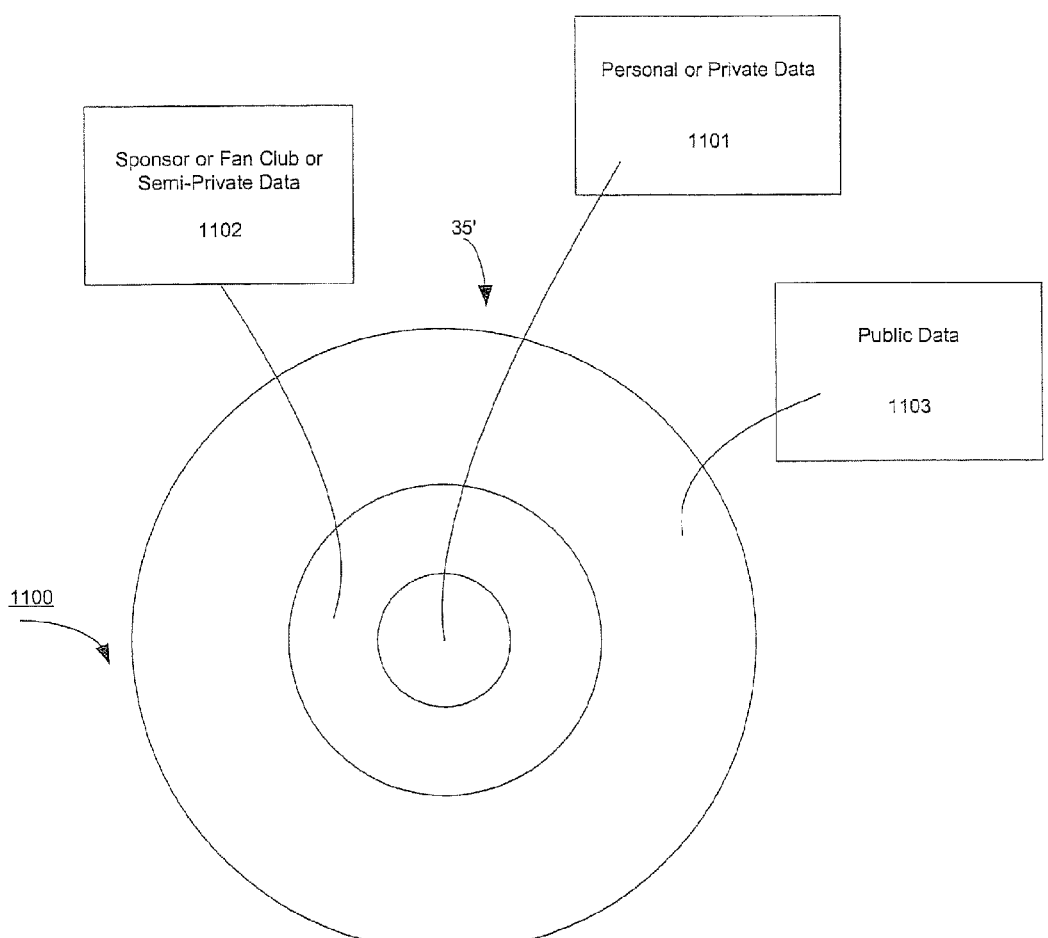
FIG. 7 is a schematic illustration of a celebrity privacy level data-sharing model according to embodiments of the present invention.

FIG. 7 schematically illustrates a multi-level privacy protocol 1100 for a privacy filter 35'. As shown, personal or private data 1101 may be shared with only immediate family or not at all (identified by the nucleus of the protocol of data). An intermediate level of data 1102 (without private data) can be shared with subscribers, fan club members and/or sponsors. Sponsors may require a celebrity to participate in this type of program to monitor compliance with endorsement contracts. A third level of data 1103 can be publicly shared.

Figure 8:
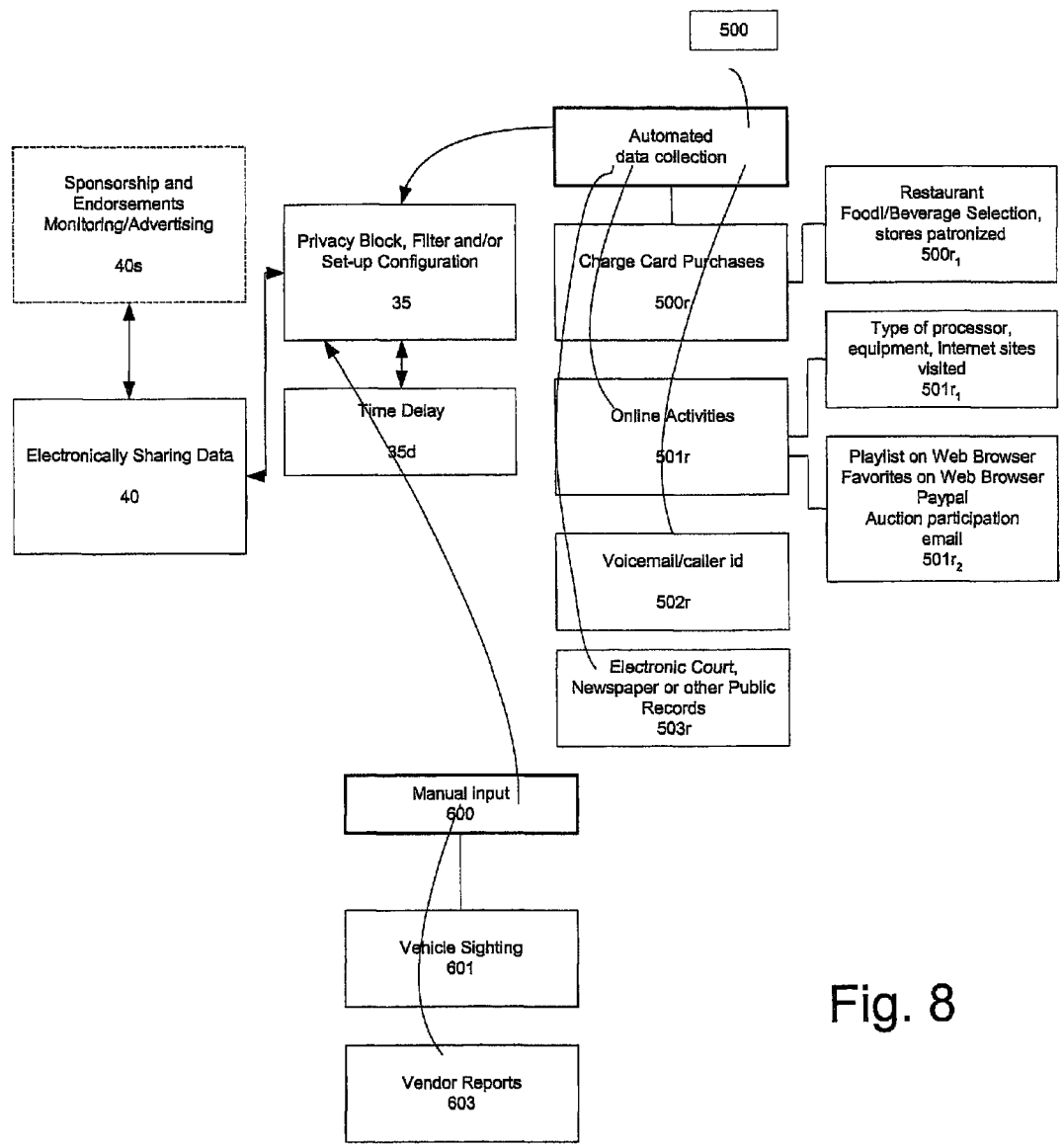
FIG. 8 is a schematic illustration of a data collection and sharing system according to embodiments of the present invention.

FIG. 8 is a schematic of another embodiment of the present invention. As shown, the system 100 can include both an automated data collection 500 and a manual input data collection 600. The automated data collection 500 can include electronically automatically obtaining charge card purchase data 500r, online activity data 501r, voicemail, IM, text messaging, or other caller identification data 502r, and/or electronic court, newspaper or other public records 503r. The charge card data 500r can include restaurant names, food/beverage selection, and/or stores patronized $500r_1$. The online activity data can include the type of processor, equipment (such as computer and/or mobile device) used by the celebrity, internet sites visited by the celebrity (and the number of times and duration) $501r_1$. Other types of online data includes playlist on a web browser, favorites on a web browser, purchases made using PAYPAL, auction participation, email sent and received (and may include to/from as well as content which may be stripped or filtered itself). It is contemplated that PAYPAL or an auction service may provide an account that is paid or partially paid for as an endorsement of their service via publication.

The manual input 600 can include vehicle sightings 601 of the celebrity by a third party, vendor reports 603 or other third party input (via email, input using a service web page and the like). The lines shown between the manual input 600 and the various manual input sources 601, 603 represent the data stream input as manual input 600 to the set-up or filter 35.

As before, the data (at least the automated data) can be filtered using a privacy block, filter or set-up configuration 35. The data may also include a time delay 35d filter of 1-24 hours or other suitable time to inhibit harassment by overzealous fans or others. The data collected can be organized and shared with users 40 and sponsors 40s. Sponsors may not require a time delay filter 35d and may be able to obtain additional data over a typical user.

Figure 9:
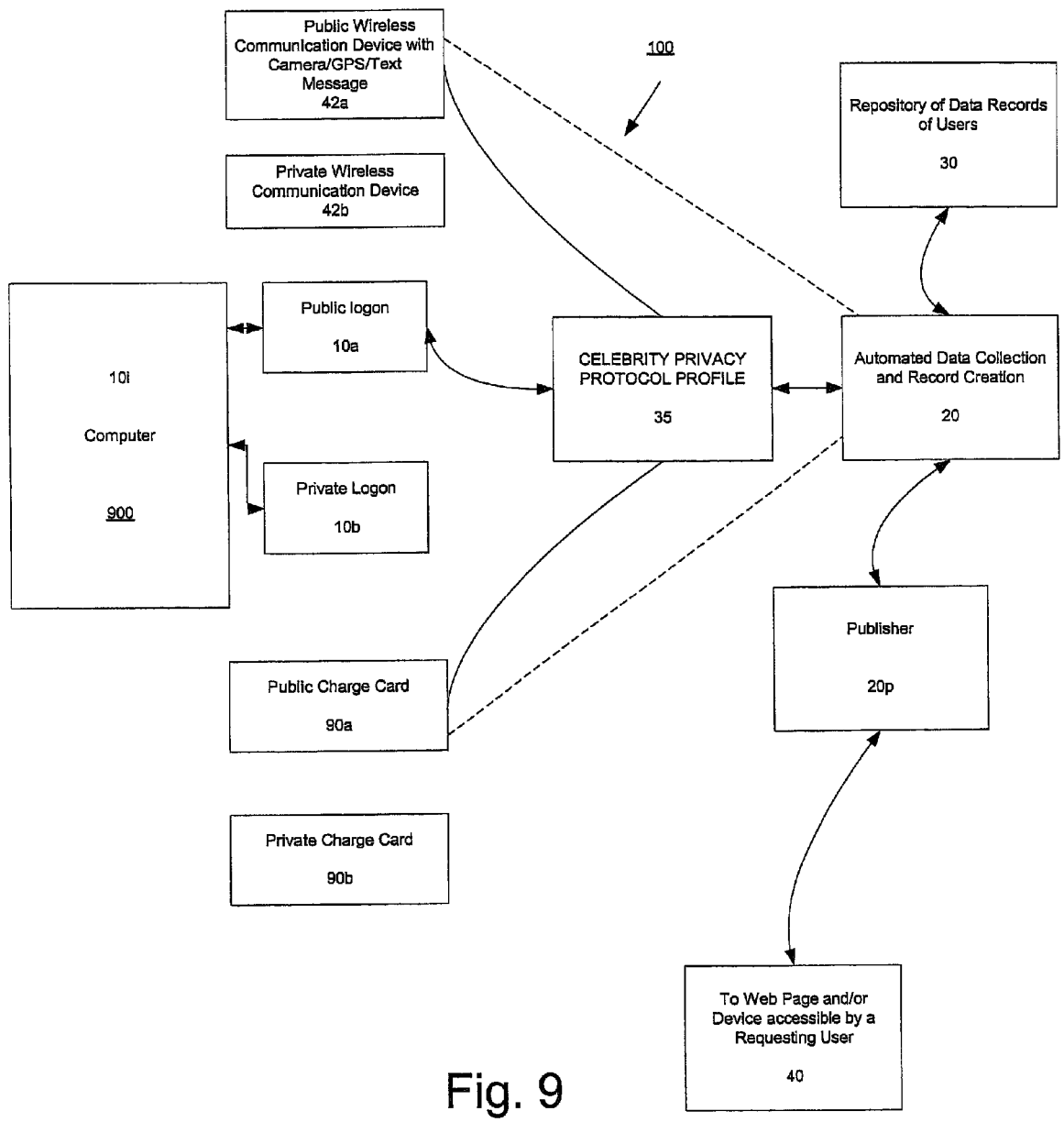
FIG. 9 is a block diagram of a system with multiple data input types used to provide celebrity data records according to embodiments of the present invention.

FIG. 9 illustrates a system 100 that has both public and private aspects. As shown, a celebrity can have a computer 900 with a system interface 10i. The interface 10i includes both a public logon 10a and a private logon 10b. The celebrity can have two mobile devices, one of which is a "public" device 42a that when activated communicates with the system 100 and the other is a private device 42b. Alternatively, the celebrity can also use a logon, application or other selection module to limit access or allow public access using a single device. The public device 42a can be a wireless communication device with camera/GPS and text messaging features. The system 100 can also be configured to monitor only charge card data made using a public card 90a. A celebrity only needs to use the private charge card 90b for purchases that he or she does not want to make publicly available.

The privacy filter 35 can be set-up by each celebrity to generate a celebrity-customized privacy protocol profile. As before, the system 100 can include a server 20 configured to have automated data collection and record creation with data from the multiple celebrity data sources (900 using 10a, 90a, 42a). The server 20 can include a publisher module or communicate with a publisher server 20p that can generate a web page and/or data presentation display for a requesting user 40. The data input from various public sources, such as 42a and 90a, can be directly into the privacy protocol 35 or into the data collection server 20. If the latter (shown as a broken line optional alternative), the received data can be sorted by the privacy profile 35 to define what can be published 20p and/or saved as data records to the repository 30.

Figure 10:
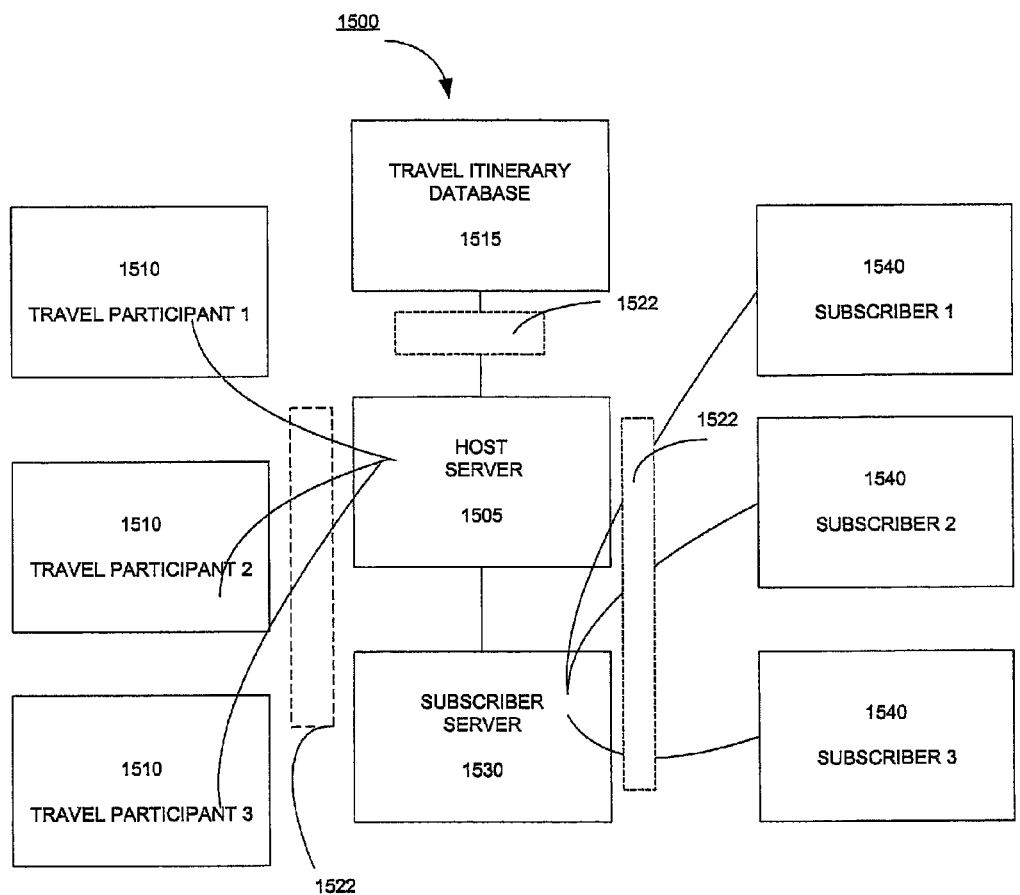
FIG. 10 is a block diagram of a network that can be used to share travel itineraries according to embodiments of the present invention.

FIG. 10 illustrates a travel system 1500 according to other embodiments of the present invention. In this embodiment, the system 1500 is configured to obtain sufficient electronic data from different travelers 1510 to be able to generate travel itineraries of the places traveled. A host server 1520 can communicate with the different travelers 1510 and the system 1500 may include firewalls 1522. The system 1500 can also include a subscriber server 1530 that can be the gatekeeper that allows subscribers or users 1540 to request data from the travel itinerary database 1515 that maintains the travel records of different travelers 1510. The subscribers 1540 may be family members authorized (via the subscriber server) to view a trip of a family member or may be commercial subscribers investigating trip itineraries, plans and schedules for themselves or others. The travel system 1500 may also be used by celebrities to allow public or fan clubs to replay a vacation itinerary taken by the celebrity.

Figure 11:
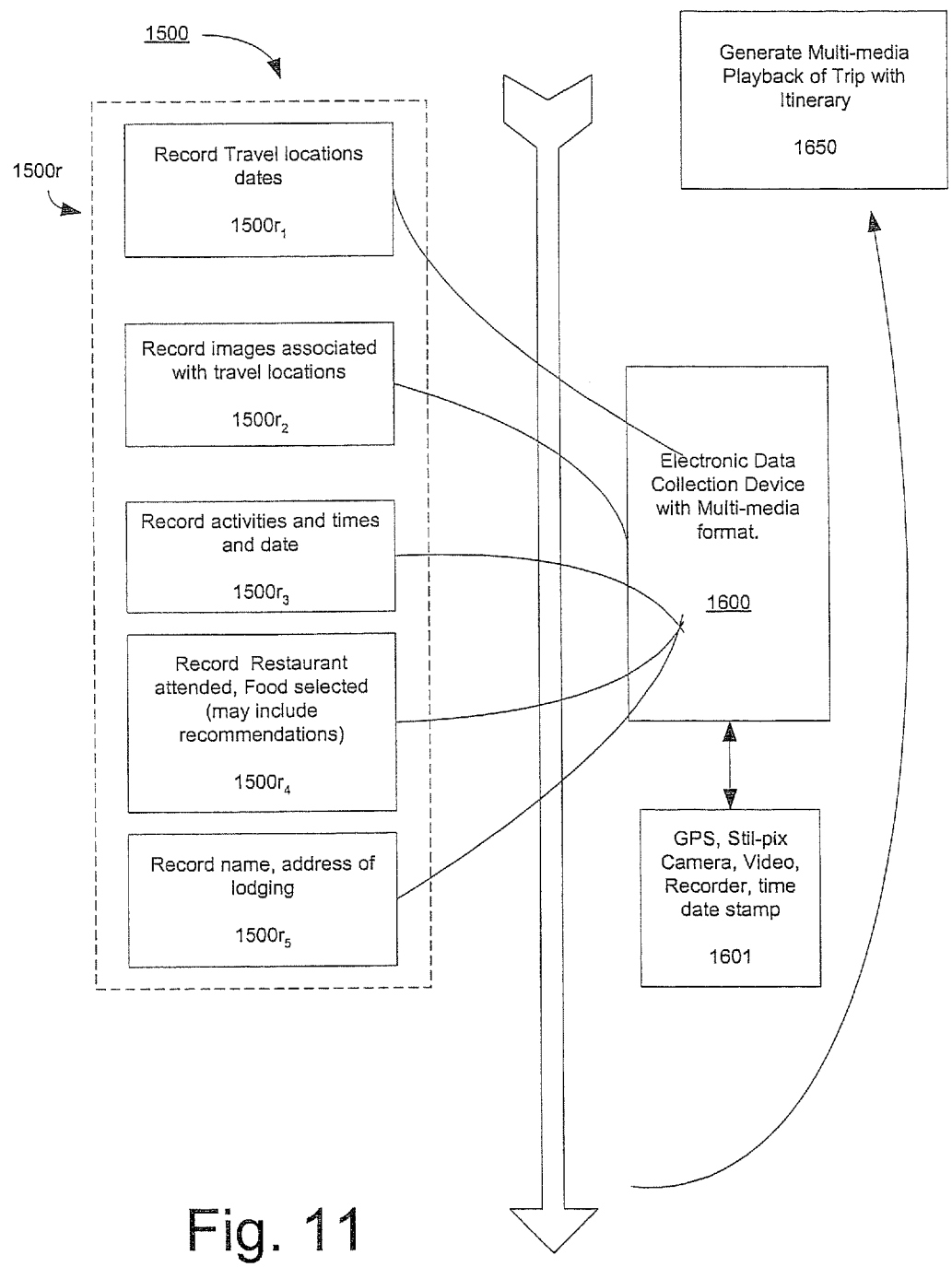
FIG. 11 is a block diagram of operations that can be used to electronically organize data records and generate a retrospective itinerary of a trip according to embodiments of the present invention.

FIG. 11 illustrates that the system 1500 can be configured to electronically collect travel data records 1500r over time during a trip. The electronic travel data records 1500r can include travel locations and dates $1500r_1$, images associated with travel destinations with dates/times (using an electronic time/date stamp) of the digital image(s) $1500r_2$, activities (tourist attractions, movies, tours) and times/dates $1500r_3$, restaurants attended, food selected and times/dates $1500r_4$, the names and addresses of lodgings $1500r_5$. A portable device 1600 may be used to store and/or obtain these records. The device 1600 can also include an input (audio, alphanumeric or icon selectable comments that may be generated in situ proximate in time to an event). The data in the device 1600 can be downloaded to a computer for time correlation and to be placed in a chronological itinerary format. The device 1601 can include a GPS system still or video stream camera, audio recorder, and time date stamp for all input.

An application or computer program can automatically correlate at least a first pass of different electronic inputs and provide a multimedia playback of the trip with a retrospectively generated itinerary summary 1650. The GPS locations can be used to define a geographic location at a certain time frame and can even be used to obtain images taken by others that correspond to that location. It is also contemplated that charge card receipts, event receipts, tickets and the like can be electronically scanned and used to faun part of travel records 1500r.

The system 1500 can include dedicated hardware that can be shared and returned and/or may include software that allows conventional pervasive devices to be used to gather desired data records.

It is contemplated that the playback can be generated with user input regarding presentation, types of data input and the like. Records 1500r can be stored in the device 1600 or transmitted during the trip and stored in the database 1515 as partial trip records that can be integrated as a complete travel summary at the end of a trip.

Thus, while digital cameras take pictures in chronological format, the images are usually manually manipulated or electronically organized after a trip. The instant invention can automatically correlate additional travel details with images and/or generate a travel itinerary summary and can group photographs with different times and events, even correlate voice inputs and comments made by a traveler during the trip.

In some embodiments, the systems 100, 1500 can be used to generate a record database of events or actions (major) that occur over a longer time period. This can allow a "playback" of longer periods of time, such as several years or even a "lifetime" of events, trips and the like of a person or family.

Figure 12:
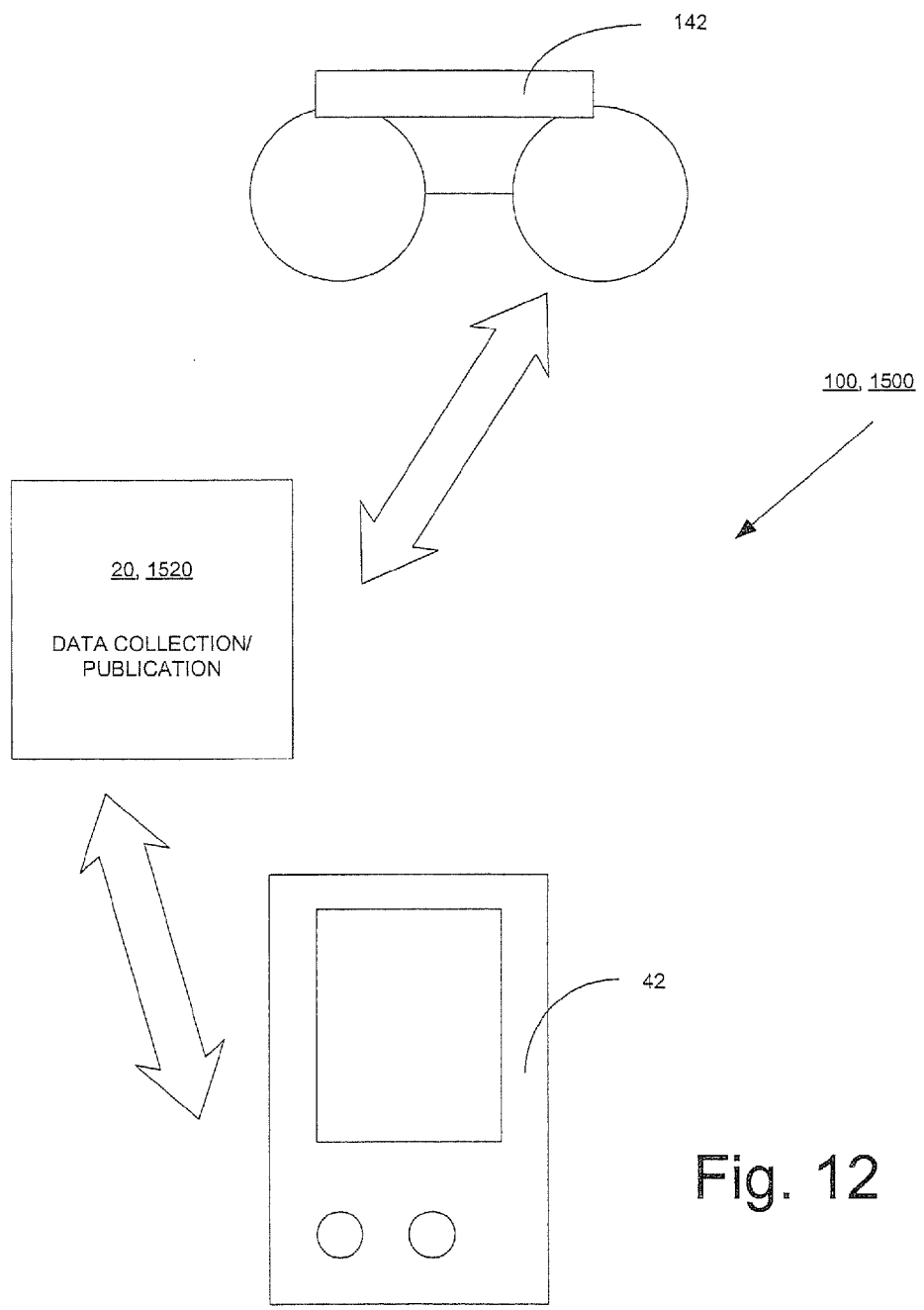
FIG. 12 is a schematic illustration of portable devices that can be used to capture trip or personal data according to embodiments of the present invention.

FIG. 12 illustrates that the systems 100, 1500 described above can use data from portable communications devices 42 and eyeglasses 142 with camera and other electronic capturing electronics (such as GPS, audio recording capacity and the like). Each can communicate with server 20, 1520 to transfer data, wirelessly or via wired connection. Using the eyeglass based device 142 can allow third parties to actually "see" what the celebrity is seeing or saw at a certain time or traveler is seeing or saw during a trip. For travel systems a user can emulate Celebrity X's trip to the Caribbean by staying in the same places and eating at the restaurants patronized by the Celebrity based on the electronic travel record and itinerary.

The figures illustrate the architecture, functionality, and operations of embodiments of the communication system 100, 1500 and/or mobile devices hardware and/or software. In this regard, each block may represent a module, a segment, or a portion of code, which may comprise one or more executable instructions for implementing the specified logical functions. It should also be noted that in other implementations, the functions noted in the blocks may occur out of the order noted or in different configurations of hardware and software. For example, two blocks shown in succession may, in fact, be executed substantially concurrently, or the blocks may sometimes be executed in the reverse order, depending on the functionality involved.

In the drawings and specification, there have been disclosed exemplary embodiments of the invention. Although specific terms are used, they are used in a generic and descriptive sense only and not for purposes of limitation, the scope of the invention being defined by the following claims.

That which is claimed:

1. A system for collecting and providing personal data of celebrities, comprising:
    a celebrity database contains personal data associated with a plurality of celebrities in communication with a plurality of celebrity computers;
    a first server in communication with the celebrity database;
    a plurality of celebrity electronic interfaces in communication with the first server, one for each respective participating celebrity, wherein the respective interfaces comprise an interactive gateway to allow a respective celebrity to select when to allow access to real-time data associated with the celebrity via the respective celebrity computer, wherein the celebrity database, the first server and the plurality of celebrity electronic interfaces are associated with a physical hardware device;
    a plurality of portable devices to provide celebrity-specific data to a requesting user, wherein the portable devices are shipped to the user, wherein the portable devices are uneditable by the requesting user and returnable to a return site for sharing with a different requesting user.

2. A system according to claim 1, wherein the interface gateway comprises an application module to define a privacy protocol with privacy criteria to identify types of personal data permitted for public capture.

3. A system according to claim 2, wherein the system is further to allow a commercial sponsor of a celebrity to monitor products that a respective celebrity uses based on data in the celebrity database.

4. A system according to claim 3, wherein the commercial sponsor has an associated privacy protocol that is less restrictive than that of the general public.

5. A system according to claim 1, further comprising a subscriber server to control a subscriber's access to data that a subscriber is allowed to receive from the first server, wherein the subscriber server is to block all access of certain celebrity records from certain users, based on the user's name.

6. A system according to claim 1, wherein the first server is to automatically capture personal data and to store the data in the celebrity database in a chronologically identifiable format.

7. A system according to claim 1, further comprising a charge card activity server in communication with the first server and the celebrity database, the charge card activity server to electronically obtain purchase data for respective celebrities and to forward the purchase data to the celebrity personal record database, wherein the extracted purchase data comprises the name and location of restaurants, the name and location of lodging, and the name and location of stores associated with the charge card records.

8. A system according to claim 1, wherein the system is to electronically capture and to store a plurality of personal data in the celebrity database, the personal data in the celebrity database comprising:
digital songs stored on a respective celebrity computer;
digital songs downloaded to a digital player;
websites visited and time spent thereat;
browser favorites;
online auction activities;
computer configuration;
computer applications; and
electronic games associated with the celebrity.

9. A system according to claim 1, wherein the celebrity database is a chronological personal record database, wherein the system to generate an electronic itinerary that substantially replicates an itinerary of a time frame of a respective celebrity, and wherein the electronic itinerary comprises the names and places that a respective celebrity visited and a date and time spent at the places.

10. A system according to claim 1, wherein the system is to generate an electronic link to allow a user to see a list of songs on an electronic playlist of a celebrity.

11. A system according to claim 1, wherein the portable devices are electronic devices that can display images and text and play digital songs to the user.

12. A system according to claim 1, wherein the devices are disposable.

13. A system according to claim 1, further comprising a plurality of portable devices for each respective celebrity to capture associated celebrity data, the data electronically transferable to the system for inclusion in the celebrity database.

14. A system according to claim 13, wherein the portable devices are to provide location data using a Global Positioning System, wherein the portable devices comprise a digital camera, an audio recorder, and an electronic time date identifier circuit, wherein the devices electronically are to obtain travel data and images of a respective celebrity, and wherein the portable devices are to electronically transfer the obtained data to the celebrity database.

* * * * *